US010827016B2

(12) United States Patent
Zhuang

(10) Patent No.: US 10,827,016 B2
(45) Date of Patent: *Nov. 3, 2020

(54) RESOURCE PROCESSING METHOD AND APPARATUS

(71) Applicant: Alibaba Group Holding Limited, George Town (KY)

(72) Inventor: Li Zhuang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,495

(22) Filed: Dec. 20, 2019

(65) Prior Publication Data

US 2020/0128090 A1 Apr. 23, 2020

Related U.S. Application Data

(63) Continuation of application No. 16/227,813, filed on Dec. 20, 2018, which is a continuation of application No. PCT/CN2017/087657, filed on Jun. 9, 2017.

(30) Foreign Application Priority Data

Jun. 22, 2016 (CN) .......................... 2016 1 0461033

(51) Int. Cl.
  *H04L 29/08* (2006.01)
  *G06Q 10/06* (2012.01)
  (Continued)

(52) U.S. Cl.
  CPC ............. *H04L 67/22* (2013.01); *G06Q 10/06* (2013.01); *G06Q 20/28* (2013.01); *H04L 47/70* (2013.01); *H04L 67/306* (2013.01)

(58) Field of Classification Search
  CPC ........ G06Q 30/04; G06Q 30/02; G06Q 40/00; H04L 12/26; H04L 43/087; H04L 12/14; H04L 12/146
  (Continued)

(56) References Cited

U.S. PATENT DOCUMENTS

2004/0106393 A1* 6/2004 Chowdhury .......... H04M 15/88
  455/406
2005/0195743 A1* 9/2005 Rochberger .......... H04M 15/51
  370/235

(Continued)

FOREIGN PATENT DOCUMENTS

| CN | 101231722 | 7/2008 |
|---|---|---|
| CN | 102405481 | 4/2012 |

(Continued)

OTHER PUBLICATIONS

International Search Report by the International Searching Authority issued in International Application No. PCT/CN2017/087657 dated Aug. 10, 2017; 8 pages.

(Continued)

*Primary Examiner* — Olusegun Goyea

(74) *Attorney, Agent, or Firm* — Fish & Richardson P.C.

(57) ABSTRACT

One example method includes receiving, by the one or more processors and from a user device, a request for a service, the request including a user identification of a user of the user device; determining, by the one or more processors, a consumption quantity of the service, the consumption quantity indicating a value associated with providing the service; determining, by the one or more processors, a pre-created general resource account associated with the user identification and including a total value that indicates an aggregated value of one or more sets of prepaid resources that belong to the user; and deducting, by the one or more processors, one or more prepaid resources from the total (Continued)

value of the general resource account, the one or more prepaid resources adding up to the value of the consumption quantity of the service, and in response, providing the service to the user device.

20 Claims, 12 Drawing Sheets

(51) Int. Cl.
  *G06Q 20/28* (2012.01)
  *H04L 12/911* (2013.01)
(58) Field of Classification Search
  USPC ....... 705/34, 44; 370/235; 455/406; 235/380
  See application file for complete search history.

(56) References Cited

U.S. PATENT DOCUMENTS

| 2007/0023504 | A1* | 2/2007 | Blankenship | G06Q 40/02 |
| | | | | 235/380 |
| 2007/0282739 | A1 | 12/2007 | Thomsen | |
| 2008/0319910 | A1 | 12/2008 | Duffus et al. | |
| 2010/0241535 | A1 | 9/2010 | Nightengale et al. | |
| 2011/0145139 | A1 | 6/2011 | Valdes et al. | |
| 2012/0047041 | A1 | 2/2012 | Akel | |
| 2014/0279320 | A1* | 9/2014 | Scheinblum | G06Q 30/04 |
| | | | | 705/34 |
| 2017/0004525 | A1* | 1/2017 | Poon | G06Q 30/0273 |
| 2019/0149627 | A1 | 5/2019 | Zhuang | |

FOREIGN PATENT DOCUMENTS

| CN | 102779304 | 11/2012 |
| CN | 103312662 | 9/2013 |
| CN | 103714452 | 4/2014 |
| CN | 104021628 | 9/2014 |
| CN | 104574527 | 4/2015 |
| EP | 2434684 | 3/2012 |
| JP | 2002345030 | 11/2002 |
| JP | 2004133693 | 4/2004 |
| JP | 2004164598 | 6/2004 |
| JP | 2004341793 | 12/2004 |
| JP | 2010277538 | 12/2010 |
| JP | 201315986 | 1/2013 |
| JP | 2014144899 | 8/2014 |
| JP | 2014235610 | 12/2014 |
| KR | 20160030336 | 3/2016 |
| RU | 2456668 | 7/2012 |
| RU | 2533681 | 11/2014 |
| WO | WO 2007052285 | 5/2007 |
| WO | WO 2007134323 | 11/2007 |
| WO | WO 2008157746 | 12/2008 |
| WO | WO 2010081147 | 7/2010 |
| WO | WO 2010108023 | 9/2010 |

OTHER PUBLICATIONS

European Extended Search Report in European Application No. 17814612.2, dated Feb. 19, 2019, 8 pages.

Nakamoto, "Bitcoin: A Peer-to-Peer Electronic Cash System," www.bitcoin.org, 2005, 9 pages.

Crosby et al., "BlockChain Technology: Beyond Bitcoin," Sutardja Center for Entrepreneurship & Technology Technical Report, Oct. 16, 2015, 35 pages.

PCT International Preliminary Report on Patentability in International Application No. PCT/CN2017/087657, dated Dec. 25, 2018, 8 pages (with English translation).

* cited by examiner

RESOURCE PROCESSING METHOD AND APPARATUS

CROSS-REFERENCE TO RELATED APPLICATIONS

This application is a continuation of U.S. patent application Ser. No. 16/227,813, filed on Dec. 20, 2018, which is a continuation of PCT Application No. PCT/CN2017/087657, filed on Jun. 9, 2017, which claims priority to Chinese Patent Application No. 201610461033.5, filed on Jun. 22, 2016, and each application is hereby incorporated by reference in its entirety.

TECHNICAL FIELD

The present application relates to the field of computer technologies, and in particular, to a resource processing method and apparatus.

BACKGROUND

When using a service provided by a service provider (for example, a website), a user usually consumes a certain quantity of the service provider's resource. In order to use the service smoothly, the user usually feeds back a corresponding quantity of resource costs to the service provider.

Currently, in practice, the service provider provides the user with an online prepaid resource (for example, an electronic voucher and an electronic prepaid card, which is referred to as a prepaid resource for short in the following). The prepaid resource can offset the corresponding quantity of resource costs when the user uses the service provided by the service provider.

In the existing technology, the user can obtain the prepaid resource one by one from the service provider, so that the user can use the obtained prepaid resource when using the service provided by the service provider. A back end server (referred to as a server for short in the following) of the service provider creates a resource account for a prepaid resource obtained by the user each time (that is, each resource account corresponds to a prepaid resource obtained by the user each time), and establishes an association between each resource account and the user. When the user needs to use a prepaid resource, the server determines each resource account associated with the user, and deducts a corresponding quantity of prepaid resources from each resource account until a total quantity of deducted prepaid resources is consistent with a total quantity of resources required for the service.

For example, a user purchases a plurality of electronic prepaid cards provided by the service provider. Correspondingly, the back end server creates a prepayment account for each electronic prepaid card, and associates the prepayment account with the user. When the user performs payment, the user provides the service provider with user information (for example, a user name). Then, the server determines a plurality of prepayment accounts of the user based on the user information, and deducts a corresponding quota from each prepayment account, to complete the payment.

However, in the previously described method, the server needs to deduct the corresponding quantity of prepaid resources from the resource accounts one by one. This process is time-consuming especially when many users use their own prepaid resources, and increase processing loads of the server. As a result, the process of deducting prepaid resources costs more time, affecting user to efficiently and smoothly obtain the service.

SUMMARY

An implementation of the present application provides a resource processing method, to resolve a problem of low efficiency of deducting a user's prepaid resource by service provider's server in the existing technology.

An implementation of the present application provides a resource processing apparatus, to resolve a problem of low efficiency of deducting a user's prepaid resource by a service provider's server in the existing technology.

The following technical solutions are used in the implementations of the present application:

An implementation of the present application provides a resource processing method, including the following: receiving a service request sent by a user; determining a resource consumption quantity corresponding to the service request; determining a pre-created general resource account of the user, where the general resource account includes all prepaid resources belonging to the user; and obtaining, from the general resource account, prepaid resources corresponding to the resource consumption quantity, to process the service request.

An implementation of the present application provides another resource processing method, including the following: receiving a payment request sent by a user; determining a payment amount corresponding to the payment request; determining a pre-created general prepaid card account of the user, where the general prepaid card account includes all prepaid card funds belonging to the user; and deducting, from the general prepaid card account, a prepaid card fund the same as the payment amount, to process the payment request.

An implementation of the present application provides a resource processing apparatus, including the following: a receiving module, configured to receive a service request sent by a user; a determining module, configured to determine a resource consumption quantity corresponding to the service request; a general account module, configured to determine a pre-created general resource account of the user, where the general resource account includes all prepaid resources belonging to the user; and a processing module, configured to obtain, from the general resource account, prepaid resources corresponding to the resource consumption quantity, to process the service request.

An implementation of the present application provides another resource processing apparatus, including the following: a receiving module, configured to receive a payment request sent by a user; a determining module, configured to determine a payment amount corresponding to the payment request; a general account module, configured to determine a pre-created general prepaid card account of the user, where the general prepaid card account includes all prepaid card funds belonging to the user; and a processing module, configured to deduct, from the general prepaid card account, a prepaid card fund the same as the payment amount, to process the payment request.

At least one technical solution used in the implementations of the present application can achieve the following beneficial effects. A server of a service provider counts prepaid resources in each resource sub-account created for a user, creates a general resource account for the user, and stores, in the general resource account, the counted total quantity of prepaid resources. As such, when obtaining the prepaid resources of the user, the server can directly obtain the corresponding quantity of prepaid resources from the general resource account instead of obtaining prepaid resources from each resource sub-account. This method can effectively reduce the time for the server to obtain the prepaid resources and further improve service processing efficiency.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings:

FIG. 5b is a schematic diagram illustrating a resource processing procedure based on the architecture shown in FIG. 5a;

DESCRIPTION OF IMPLEMENTATIONS

To make the objectives, technical solutions, and advantages of the present application clearer, the following describes the technical solutions of the present application with reference to the specific implementations and the corresponding accompanying drawings of the present application. The described implementations are some rather than all of the implementations of the present application. All other implementations obtained by a person of ordinary skill in the art based on the implementations of the present application without creative efforts shall fall within the protection scope of the present application.

As described above, when a user uses prepaid resources, a server usually obtains the corresponding prepaid resources from prepayment accounts corresponding to the user one by one. This process is time-consuming, causing low efficiency of service providing from a service provider to the user.

In view of this, a method for quickly and conveniently obtaining prepaid resources in prepayment accounts is required when the user uses the prepaid resources. The implementations of the present application provide a resource processing method, so that a server can quickly obtain prepaid resources of a user, improving efficiency of providing a service for the user.

It is worthwhile to note that the service provider in the implementations of the present application can be a service provider that can provide an online service, for example, a website or a telecommunications operator; or can be a service provider that can provide an offline service (in this scenario, the service provider still provides an online prepaid resource), for example, a store or a restaurant. In this case, a server of the service provider can be, for example, a web site server, a telecommunications operator server, or a server configured to process an online prepaid resource. The present application is not limited thereto here.

The technical solutions provided by the implementations of the present application are described in detail below with reference to the accompanying drawings.

Figure 1A:
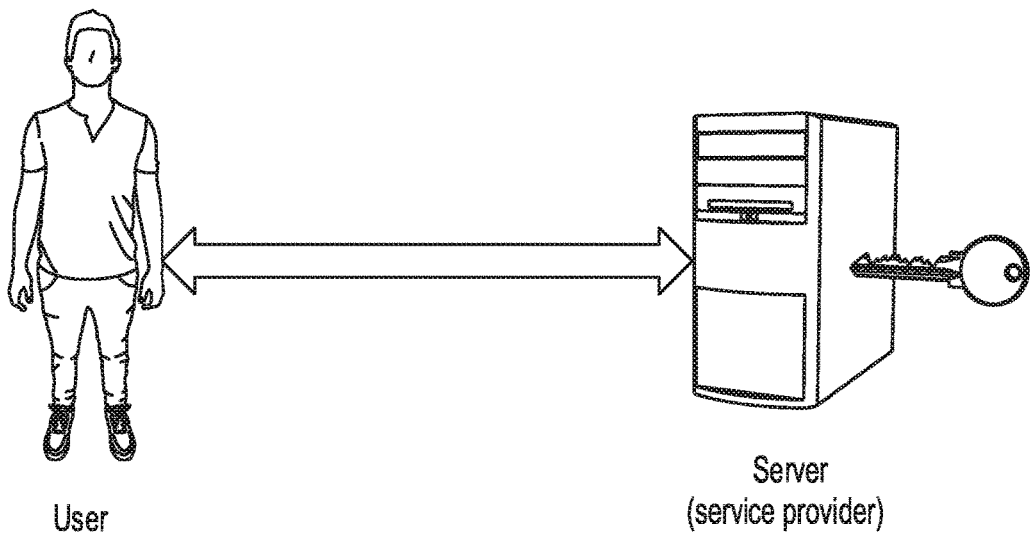
FIG. 1a is a schematic diagram illustrating a resource processing architecture, according to an implementation of the present application.
Figure 1B:
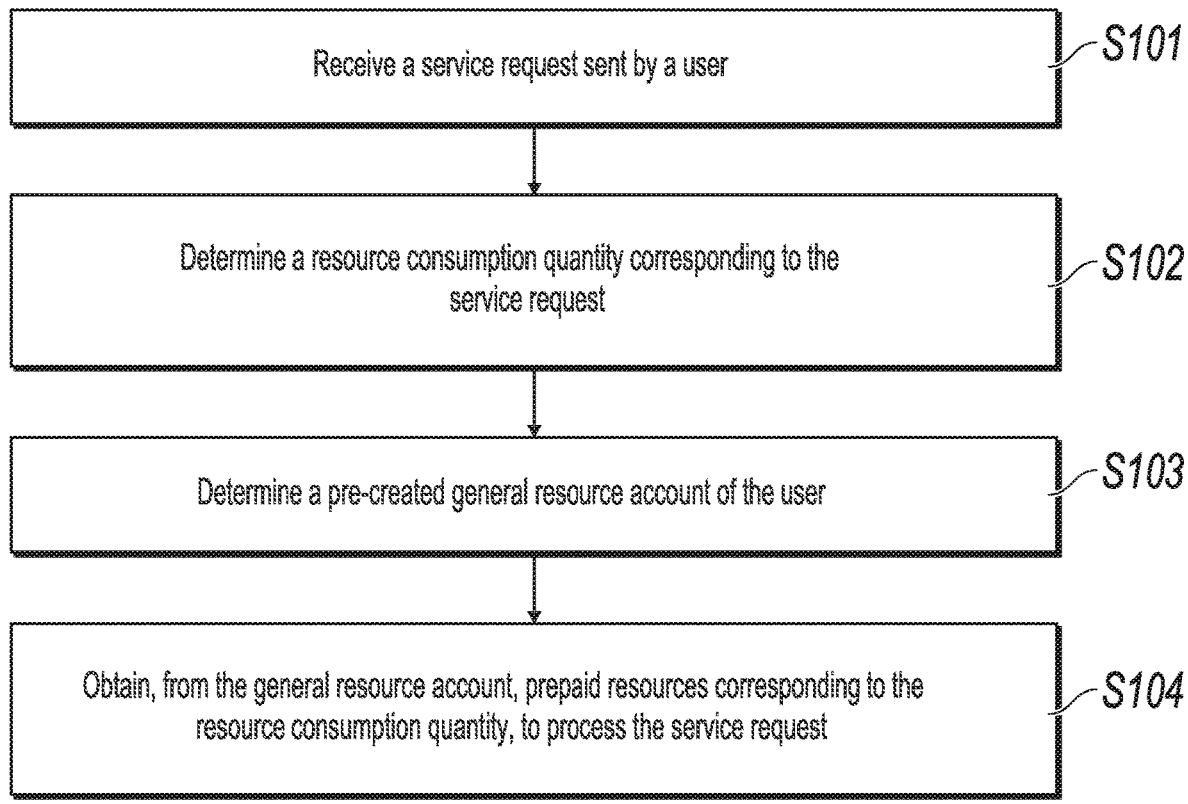
FIG. 1b is a schematic diagram illustrating a resource processing process, according to an implementation of the present application.

As shown in FIG. 1a, FIG. 1a is a schematic diagram illustrating a resource processing architecture, according to an implementation of the present application. Based on the architecture shown in FIG. 1a, FIG. 1b shows a resource processing method according to an implementation of the present application. The resource processing method specifically includes the following steps:

S101. Receive a service request sent by a user.

In an actual application scenario, when the user needs to use a service provided by a service provider, the user can send a corresponding service request. For example, when using a cloud computing service, the user sends a cloud computing request; or when using an online storage service, the user sends a storage request. Correspondingly, a server of the service provider receives the service request sent by the user.

Certainly, in an optional method of the present implementation of the present application, the user can use an end-user device (which can include a mobile phone, a tablet computer, a computer, etc.) to scan a code, click on a service control on a corresponding page, etc., to send the service request to the service provider. The present application is not limited thereto here.

S102. Determine a resource consumption quantity corresponding to the service request.

As described above, when the service provider processes the service request of the user, a certain quantity of resources are usually consumed. For example, when the service provider provides a cloud computing service for the user, a corresponding processing resource is consumed; and when the service provider provides a network storage service, storage space in a database is consumed. Therefore, the user needs to pay corresponding resource costs to the service provider.

In this case, after receiving the service request of the user, the server first determines a quantity of resources required for processing the service request (that is, a service consumption quantity), to subsequently determine the resource costs to be paid by the user.

S103. Determine a pre-created general resource account of the user.

The general resource account includes all prepaid resources belonging to the user.

In the present implementation of the present application, the general resource account of the user is pre-created based on resource accounts of the user (to be distinguished from the general resource account, a resource account created each time the user equipment obtains prepaid resources is referred to as a resource sub-account). The prepaid resources stored in the general resource account is a sum of prepaid resources in the resource sub-accounts of the user, in other words, the general resource account includes a total quantity of prepaid resources belonging to the user.

For example, assume that a user has resource accounts A and B, a quantity of prepaid resources in resource sub-account A is 100, and a quantity of prepaid resources included in resource sub-account B is 200. As such, the total quantity of prepaid resources included in a general resource account of the user is 300.

It is worthwhile to note that the general resource account in the present implementation of the present application is created by the server for the user. In a method of the present implementation of the present application, the server stores an identifier of the user (for example, a user ID or a service account registered with the server by the user), so that the server can create the general resource account for the user based on the identifier of the user. For example, if the user registers a service account named "xiaoming" with the server, the server can create a general resource account "xiaoming-general resource account" for the user based on the account name of the service account. After creating the general resource account, the server gathers all prepaid resources of the user and stores all the prepaid resources in the general resource account.

Certainly, the previous example describes merely a feasible method for creating a general resource account, and does not constitute any limitation on the present application.

The technique presented herein is different from the existing technology that in the present implementation of the present application, the general resource account gathers all the prepaid resources belonging to the user, so that there is no need to deduct prepaid resources from each resource sub-account.

S104. Obtain, from the general resource account, prepaid resources corresponding to the resource consumption quantity, to process the service request.

After the quantity of resources to be consumed for the service request and the total quantity of prepaid resources included in the general resource account of the user are determined, the corresponding quantity of resources can be deducted from the general resource account of the user.

It is worthwhile to note that different cases can occur in an actual application scenario.

In a first scenario, the quantity of resources to be consumed for the service request is not greater than the total quantity of prepaid resources included in the general resource account, so that the server can deduct, from the general resource account, the quantity of resources to be consumed for the service request. For example, assume that the quantity of resources to be consumed for the service request is 80, and the total quantity of prepaid resources in the general resource account of the user is 100. The quantity 80 of prepaid resources can be deducted from the general resource account, and the remaining quantity of prepaid resources in the general resource account is 20.

In a second scenario, the quantity of resources to be consumed for the service request is greater than the total quantity of prepaid resources included in the general resource account. As such, the server can feed back a failure notification to the end-user device to notify the user that the prepaid resources belonging to the user are insufficient to satisfy the resource consumption quantity of the service request; or the server can deduct all the prepaid resources in the general resource account, and feed back a difference compensation notification to the end-user device for the insufficient prepaid resource part, and the user can pay the remaining quantity of resources by using another method. For example, assume that the quantity of resources to be consumed for the service request is 200, and the total quantity of prepaid resources in the general resource account of the user is 100. The total quantity of prepaid resources in the general resource account of the user can be deducted first. In this case, the quantity of resources to be consumed for the service request still has 100 unpaid. Therefore, the user can directly pay the resources, etc., to compensate for the remaining resource consumption quantity. The present application is not limited thereto here.

By using the previous steps, the server of the service provider pre-creates the general resource account of the user. The general resource account gathers all the prepaid resources belonging to the user. After the server receives the service request of the user, the server determines the quantity of resources to be consumed for the service request, so that the server can directly obtain the corresponding quantity of prepaid resources from the general resource account to compensate for the resources to be consumed for the service request. In the existing technology, the prepaid resources are deducted from each resource sub-account of the user. In comparison with the existing technology, the method in the present implementation of the present application enables the corresponding quantity of prepaid resources to be directly obtained from the general resource account of the user, effectively improving efficiency of obtaining the prepaid resources. This prevents the server from calculating a quantity of prepaid resources in each resource sub-account, thereby reducing work load on the server.

It is worthwhile to note that the steps of the method provided in the previous implementation can be performed by the same device, and specifically, can be the server of the service provider.

The following describes a process of creating a general resource account in detail.

Figure 2A:
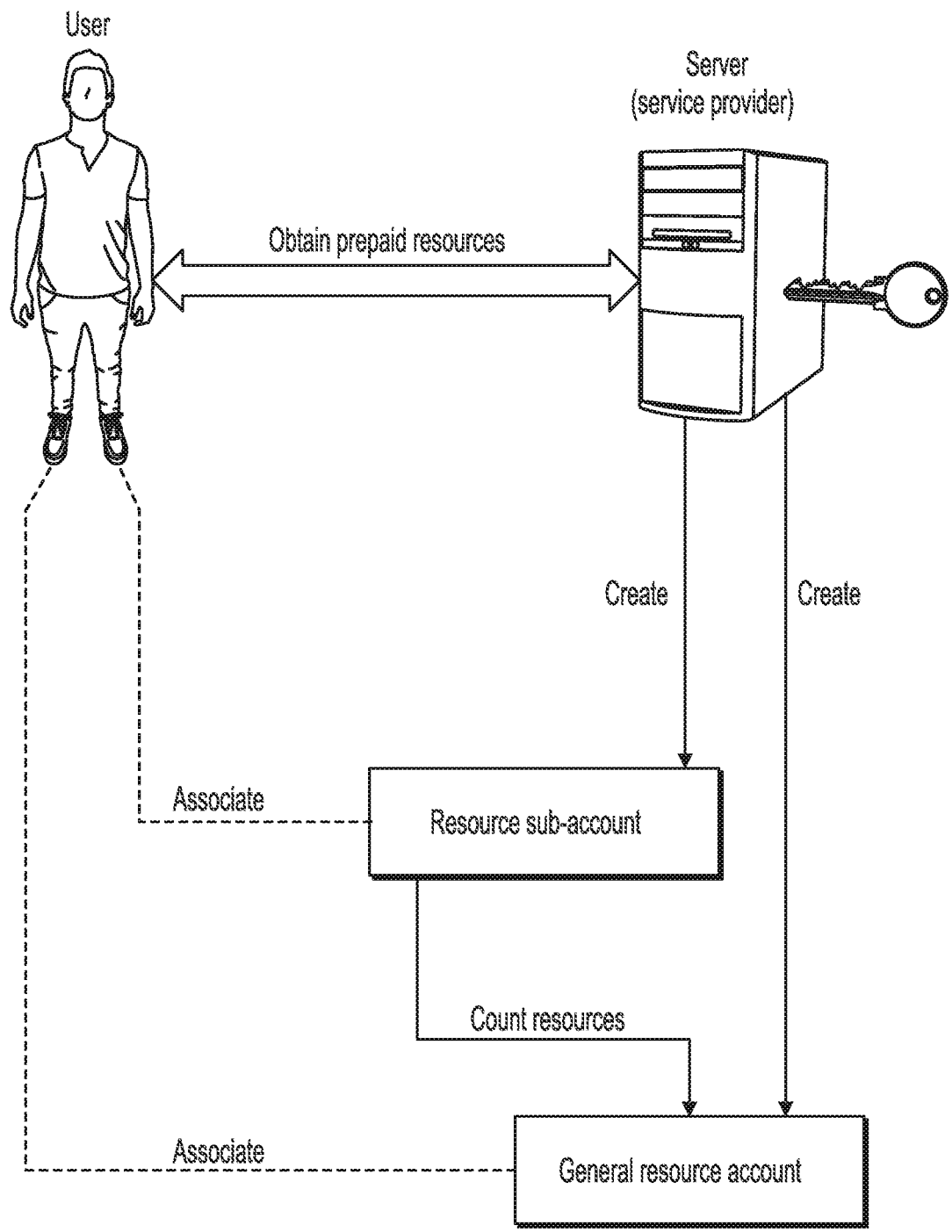
FIG. 2a is a schematic diagram illustrating resource account creation, according to an implementation of the present application.

As shown in FIG. 2a, FIG. 2a is a schematic diagram illustrating a process that a server creates a general resource account, according to an implementation of the present application. With reference to FIG. 2a, pre-creating a general resource account of a user includes the following: determining each pre-created resource sub-account of the user; counting a total resource quantity of prepaid resources of the resource sub-accounts; and creating the general resource account for the user based on the counted total resource quantity, and storing, in the general resource account, the prepaid resources corresponding to the total resource quantity.

Each resource sub-account stores prepaid resources obtained by the user each time.

After the user obtains prepaid resources from a service provider (for example, an electronic prepaid card or an electronic voucher purchased by the user), the server creates a corresponding account for the user to store the obtained prepaid resources. In practice, when obtaining the prepaid resources from the service provider, the user uses an identifier of the user (for example, the user ID or service account). Therefore, the server can obtain the identifier of the user each time the user obtains the prepaid resources, and create a resource sub-account belonging to the user.

Each resource sub-account belonging to the user stores prepaid resources obtained by the user each time. Therefore, the resource sub-accounts are counted to determine the total quantity of prepaid resources belonging to the user. On this basis, the general resource account is created for the user, and all the prepaid resources belonging to the user are gathered and stored in the general resource account.

Figure 2B:
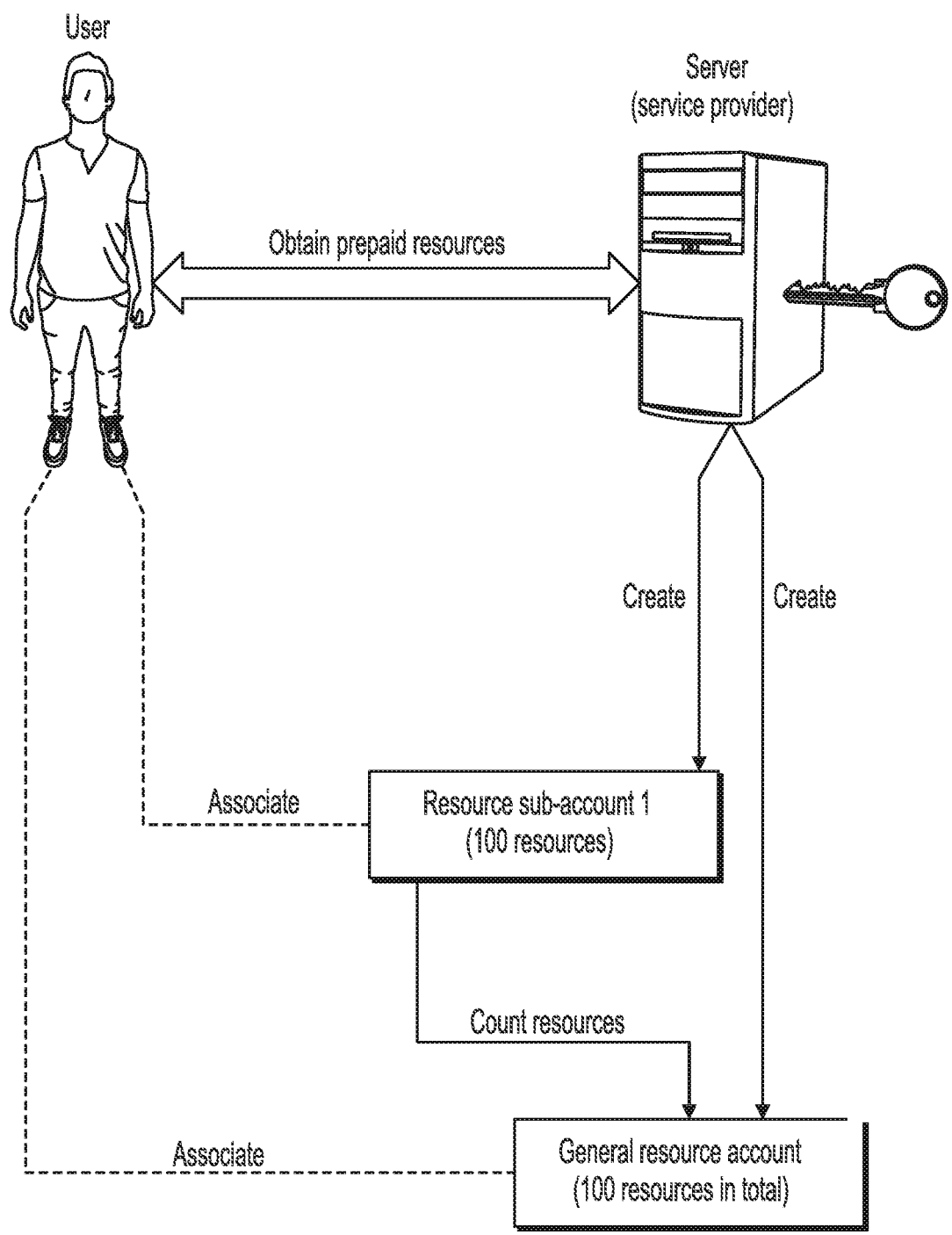
FIG. 2b is a schematic diagram illustrating resource account creation, according to an implementation of the present application.

In a method of the present implementation of the present application, the general resource account of the user can be created when the server creates the first resource sub-account for the user. As shown in FIG. 2b, the server monitors the first resource sub-account (resource sub-account 1 in FIG. 2b) created for the user. When detecting that the resource sub-account is created, the server counts a quantity of prepaid resources in the resource sub-account, uses the counted quantity of prepaid resources as a current total resource quantity, creates the general resource account for the user, and stores, in the general resource account, the prepaid resources corresponding to the quantity of prepaid resources. It can be seen from FIG. 2b that the total quantity of resources in the general resource account is the quantity of resources included in resource sub-account 1. In other words, the total quantity of resources is 100.

In other words, the server creates the general resource account for the user when the server creates the resource sub-account for the user for the first time. Afterwards, if the user obtains a corresponding quantity of new prepaid resources, the server creates a new resource sub-account for the user. Meanwhile, the quantity of prepaid resources in the general resource account also changes. To be specific, the server adds the prepaid resources in the new resource sub-account to the general resource account in real time, so that the total resource quantity in the general resource account increases by the corresponding quantity of prepaid resources.

Figure 2C:
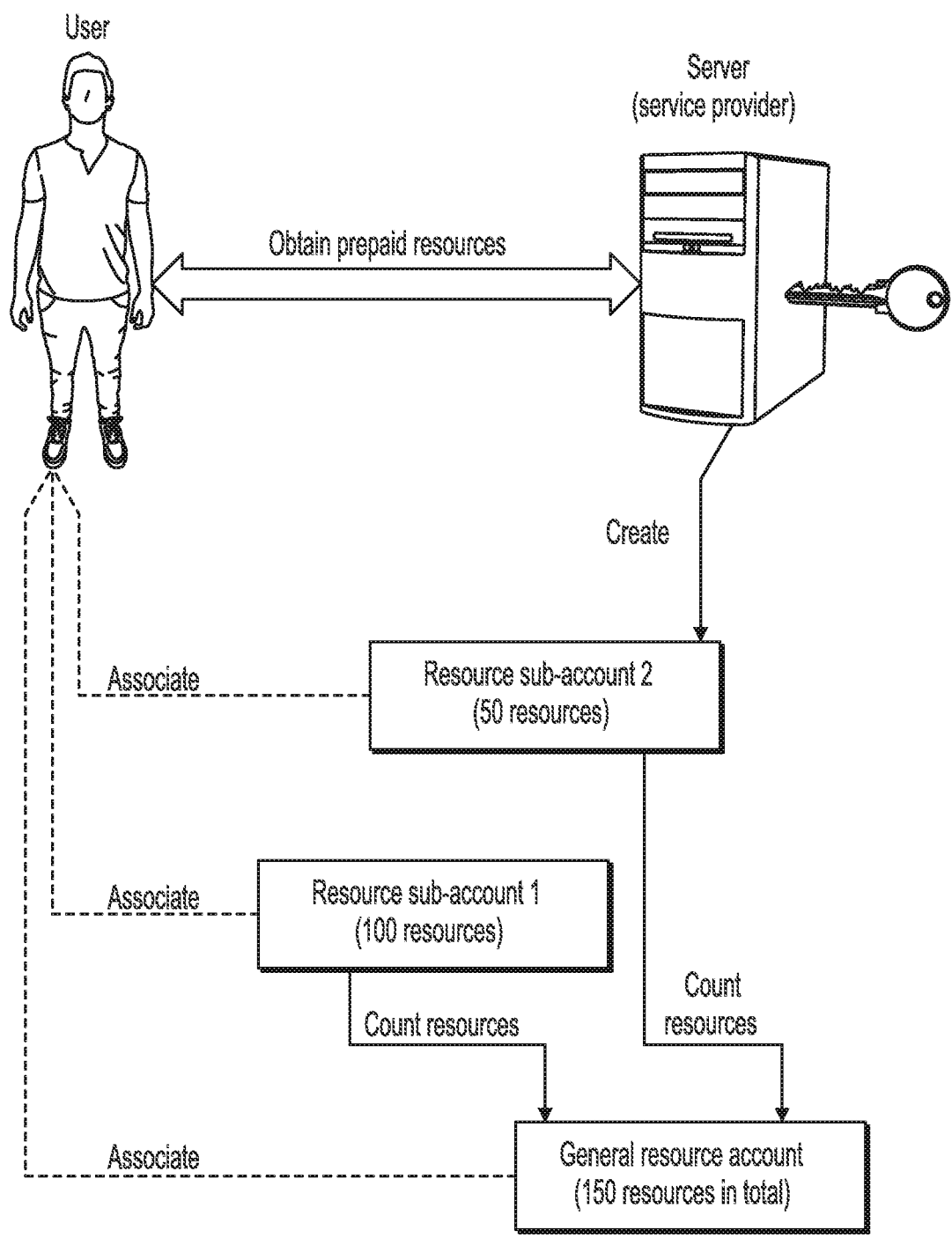
FIG. 2c is a schematic diagram illustrating resource account creation, according to an implementation of the present application.

For example, as shown in FIG. 2c, the user obtains new prepaid resources (assume that a quantity of prepaid resources is 50), and then the server creates a new resource sub-account—resource sub-account 2 (a quantity of prepaid resources stored in resource sub-account 2 is 50) for the user. In this case, the server adds the quantity of prepaid resources in resource sub-account 2 to the general resource account. Therefore, in FIG. 2c, the total resource quantity in the general resource account changes to 150.

The creation of a general resource account can combine all prepaid resources obtained by the user. It can be understood that, when obtaining the prepaid resources of the user, the server can use the general resource account to directly obtain the prepaid resources instead of obtaining the prepaid resources from each resource sub-account. In comparison with the method in the existing technology, the method using a general resource account in the present implementation of the present application can effectively reduce a time for the server to obtain the prepaid resources of the user.

In practice, the prepaid resources provided by the service provider can have different conversion coefficients. To be specific, the same quantity of prepaid resources with different conversion coefficients can offset different quantities of resource costs. For example, when a conversion coefficient is 1, the user can use 100 prepaid resources to offset the same quantity (i.e. 100) of resource costs. In other words, if the conversion coefficient is 1 and a resource consumption quantity for a service request sent by the user is 100, the server obtains 100 prepaid resources belonging to the user.

However, if the conversion coefficient is 2, the user can use 100 prepaid resources to offset 200 resource costs. In other words, if the conversion coefficient is 2 and a resource consumption quantity for a service request sent by the user is 100, the server obtains 50 prepaid resources belonging to the user.

In view of this, when the server counts a total quantity of resources in resource sub-accounts, the server needs to make the count based on a conversion coefficient of each resource sub-account. The counting a total resource quantity of prepaid resources of the resource sub-accounts includes the following: determining a conversion coefficient of prepaid resources in each resource sub-account; and counting the total resource quantity of the prepaid resources of the resource sub-accounts based on the determined conversion coefficient of each resource sub-account.

In the present implementation of the present application, the quantity of prepaid resources in the general resource account is a sum of converted quantities of prepaid resources in the resource sub-accounts.

After the user sends the service request, the server can obtain, based on the resource consumption quantity corresponding to the service request, the same quantity of prepaid resources from the general resource account.

It is worthwhile to note that the quantity of prepaid resources in the resource sub-account corresponds to the total quantity of prepaid resources in the general resource account in real time. In other words, the quantity of prepaid resources in the general resource account correspondingly changes with the quantity of prepaid resources in the resource sub-account. Likewise, when the total quantity of prepaid resources in the general resource account changes, the server correspondingly adjusts the quantity of prepaid resources in the resource sub-account. Therefore, after obtaining a certain quantity of prepaid resources from the general resource account, the server deducts the same quantity of prepaid resources from the resource sub-accounts.

In the present implementation of the present application, the method shown in FIG. 1a and FIG. 1b further includes the following: deducting a corresponding quantity of prepaid resources from each resource sub-account corresponding to the user, based on the quantity of prepaid resources obtained from the general resource account of the user.

In the present implementation of the present application, the prepaid resources can be deducted from each resource sub-account in a plurality of methods. For example, in practice, the user can obtain prepaid resources for a plurality of times, and the server creates a resource sub-account each time the user obtains prepaid resources. Therefore, a chronological order exists among resource sub-accounts of the user, so that the prepaid resources can be deducted based on the time sequence of the creating time of the resource sub-accounts.

Figure 3:
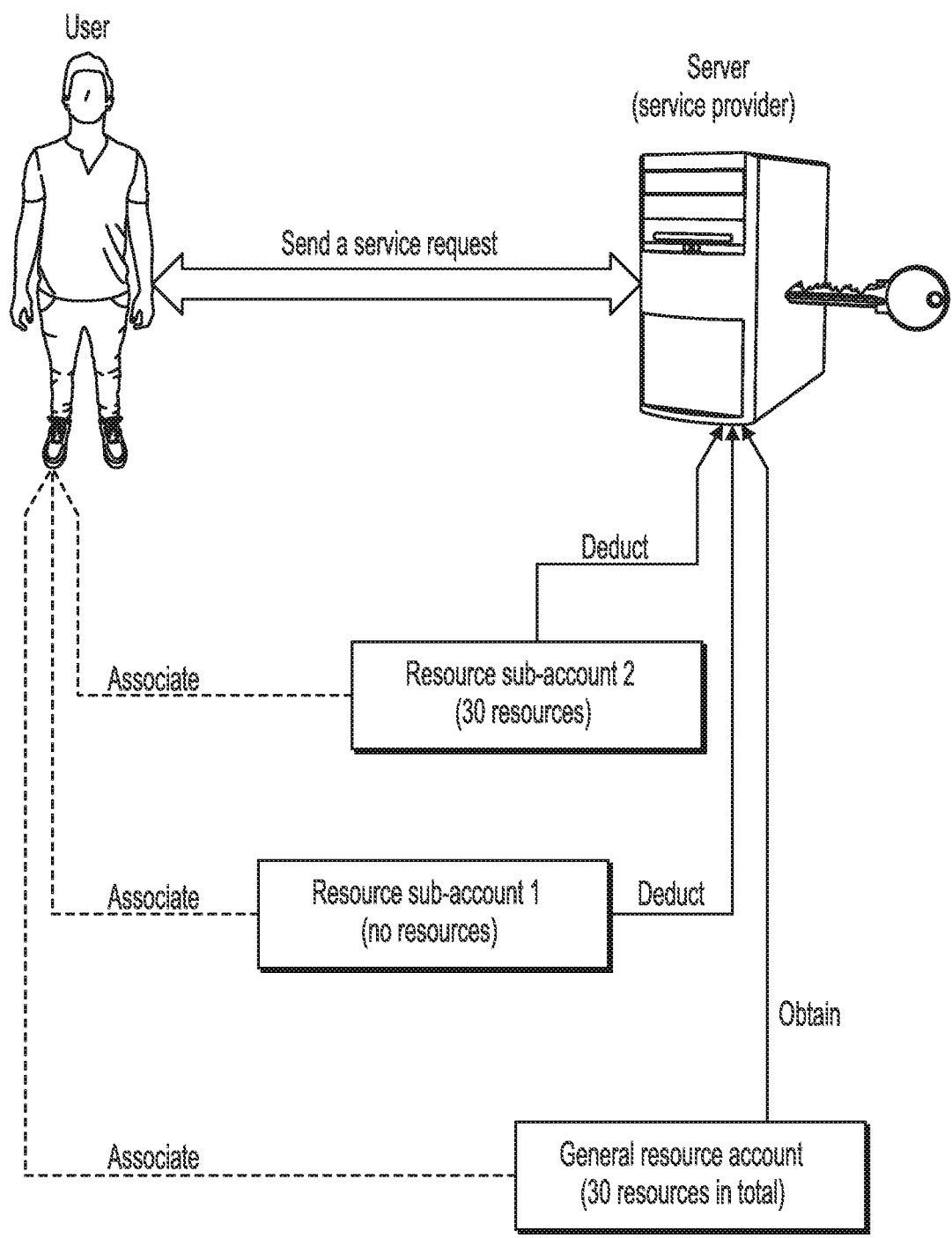
FIG. 3 is a schematic diagram illustrating a resource account obtained after a prepaid resource is used, according to an implementation of the present application.

For example, in a case shown in FIG. 2c, resource sub-account 1 is created earlier than resource sub-account 2. If the server obtains 120 prepaid resources from the general resource account of the user, the same quantity of prepaid resources needs to be deducted from resource sub-account 1 and resource sub-account 2. Because the resource sub-account 1 is created earlier, the server can first deduct the prepaid resources from resource sub-account 1 based on the time sequence of the creating time of the resource sub-accounts. By doing so, as shown in FIG. 3, there is no more prepaid resource in resource sub-account 1, but 20 prepaid resources need to be further deducted. Therefore, the server deducts 20 prepaid resources from resource sub-account 2. In FIG. 3, there are 30 prepaid resources left in resource sub-account 2.

For another example, different resource sub-accounts can have different conversion coefficients, and the prepaid resources in each resource sub-account can be deducted based on a sequence of conversion coefficients.

Figure 4A:
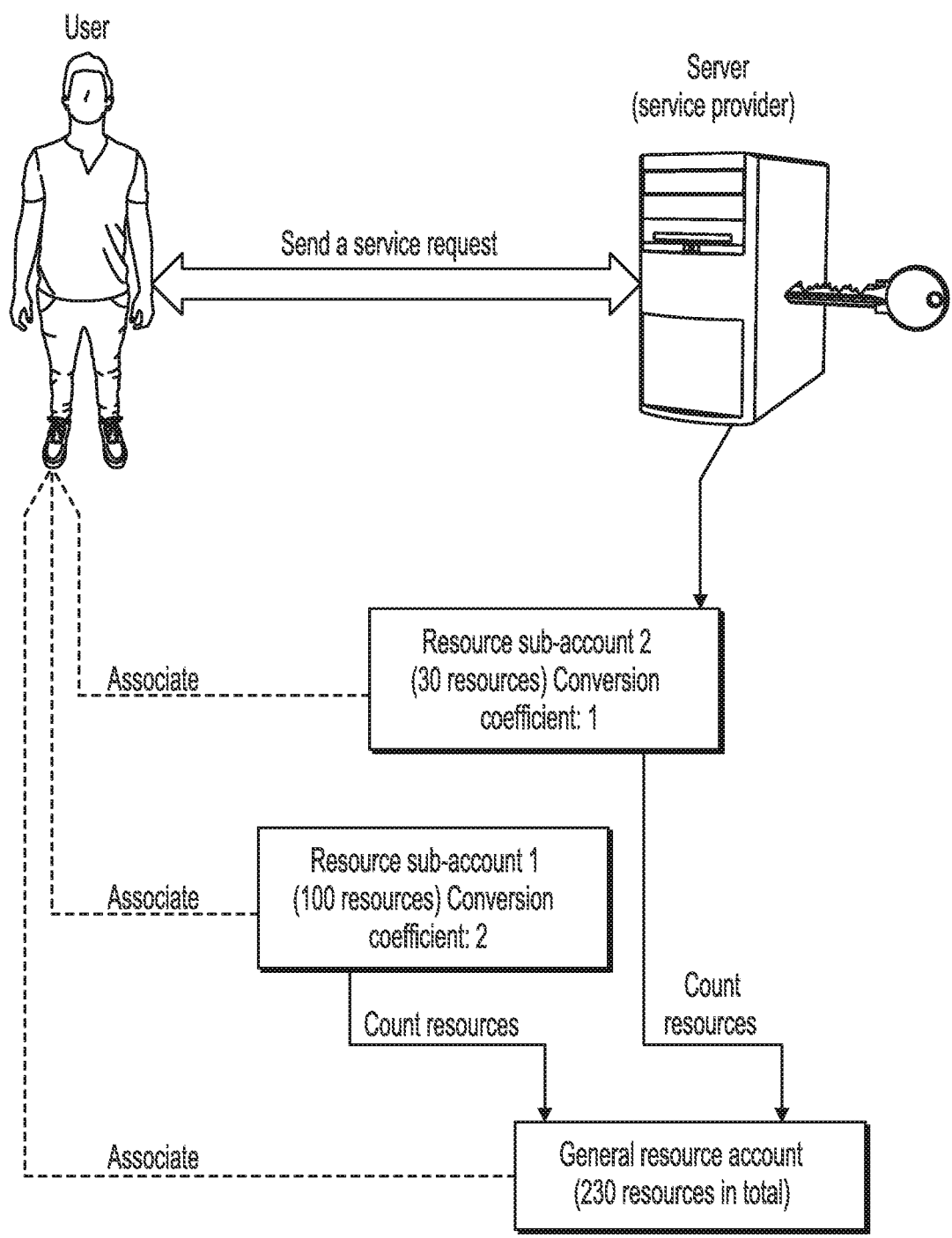
FIG. 4a is a schematic diagram illustrating a prepaid resource when there is a conversion coefficient, according to an implementation of the present application.
Figure 4B:
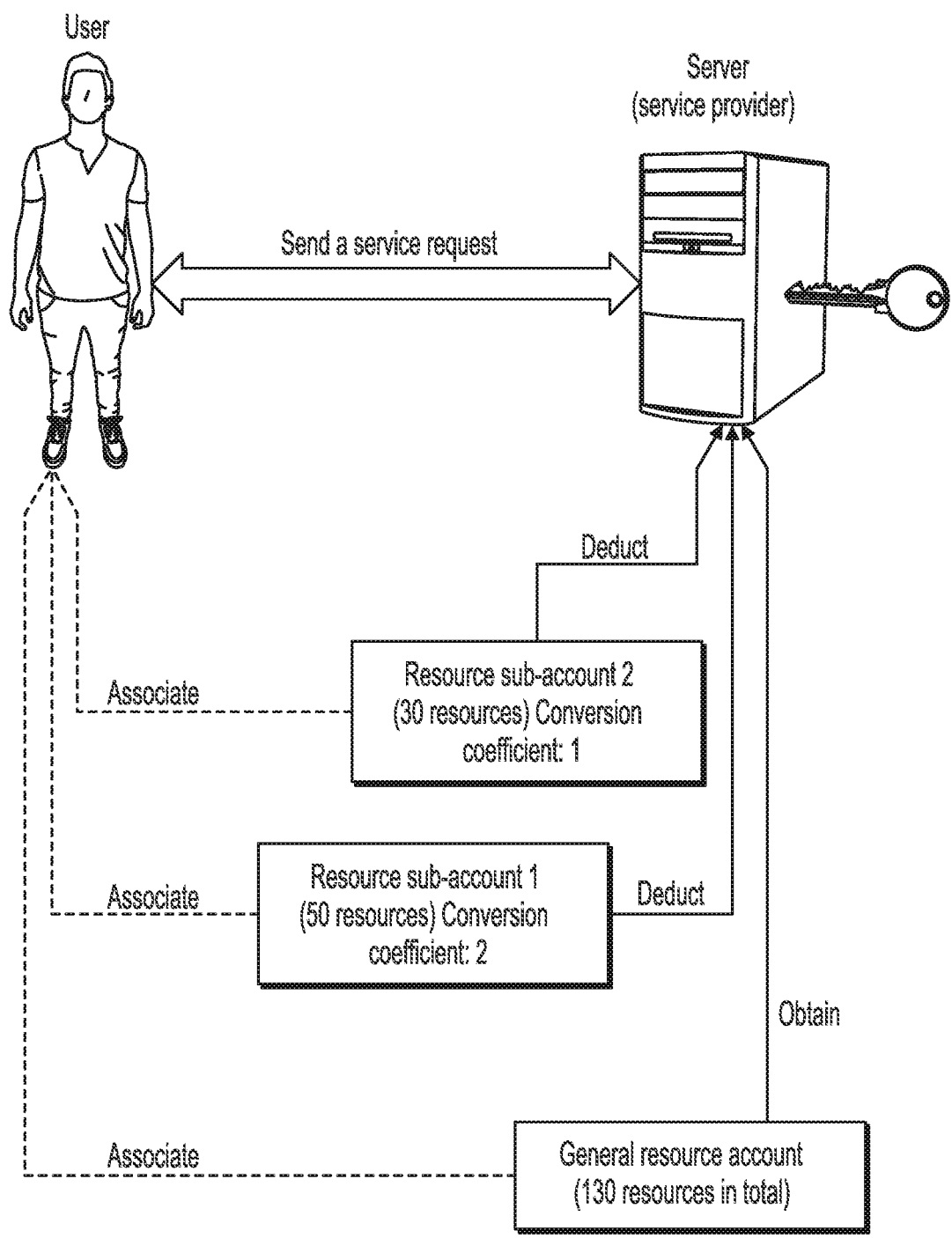
FIG. 4b is a schematic diagram illustrating a prepaid resource when there is a conversion coefficient, according to an implementation of the present application.

In FIG. 4a, the quantity of prepaid resources in resource sub-account 1 is 100, and the conversion coefficient is 2; the quantity of prepaid resources in resource sub-account 2 is 30, and the conversion coefficient is 1. In this case, the total quantity of resources in the general resource account is 100*2+30=230. As shown in FIG. 4b, if a service to be used by the user needs to consume 100 resources, the server directly obtains 100 resources from the general resource account (causing 130 resources to be left in the general resource account), and then the server deducts 50 prepaid resources from resource sub-account 1 based on a priority of conversion coefficients.

Therefore, in the previous content, the deducting a corresponding quantity of prepaid resources from each resource sub-account corresponding to the user includes the following: deducting the corresponding quantity of prepaid resources from each resource sub-account based on a time sequence of establishing associations between the resource sub-accounts and the user; or determining a priority sequence of the resource sub-accounts based on the conversion coefficient of the prepaid resources in each resource sub-account, and deducting the corresponding quantity of prepaid resources from each resource sub-account based on the determined priority sequence of the resource sub-accounts.

In practice, prepaid resources in the resource sub-accounts can be alternatively deducted based on a sequence of the resource sub-accounts that is set by the user. When some resource sub-accounts have a validity time limit, the prepaid resources can be deducted based on the validity time limit. The present application is not limited thereto here.

It is worthwhile to note that, in the present implementation of the present application, the prepaid resources can be deducted from the resource sub-accounts after the service provider provides a service. Alternatively, the service provider can provide the corresponding service for the user after the server obtains the prepaid resources from the general resource account, ensuring that the user can obtain the service in time. On this basis, the server subsequently deducts the prepaid resources from the resource sub-accounts. The user can still obtain the service in time by using this method.

Figure 5A:
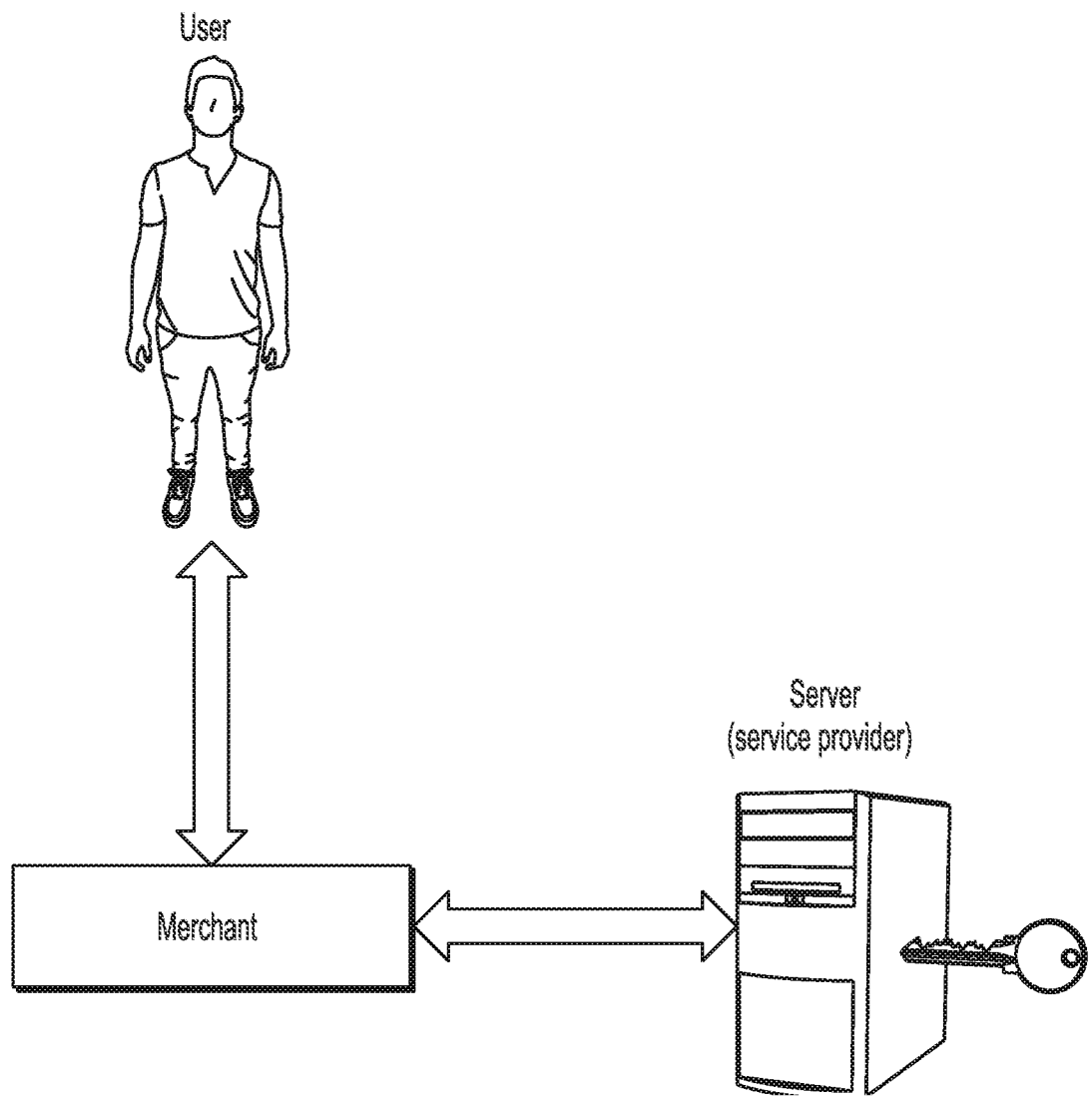
FIG. 5a is a schematic diagram illustrating a resource processing architecture in a merchant scenario, according to an implementation of the present application.

The previous method in the present application can be applied to a prepaid card scenario in an actual application scenario. An architecture in the actual application scenario is shown in FIG. 5a. The actual scenario includes a user, a merchant, and a payment service provider. The user obtains a corresponding service from the merchant (for example, the merchant can provide services such as merchandise, food/drink, or accommodation for the user). The merchant can provide an electronic prepaid card (or an electronic voucher, etc., for ease of description, referred to as a prepaid card in the following) for the user. The payment service provider technically supports online payment for the prepaid card provided by the merchant. In addition, the user registers a user account with the payment service provider. In practice, the user can purchase a corresponding merchandise from the merchant by using the prepaid card. The prepaid card here can be considered as a prepaid resource. Different prepaid cards have different amounts and conversion coefficients. The user can purchase a plurality of prepaid cards. In this scenario, as shown in FIG. 5b, an implementation of the present application provides a resource processing method.

Figure 5B:
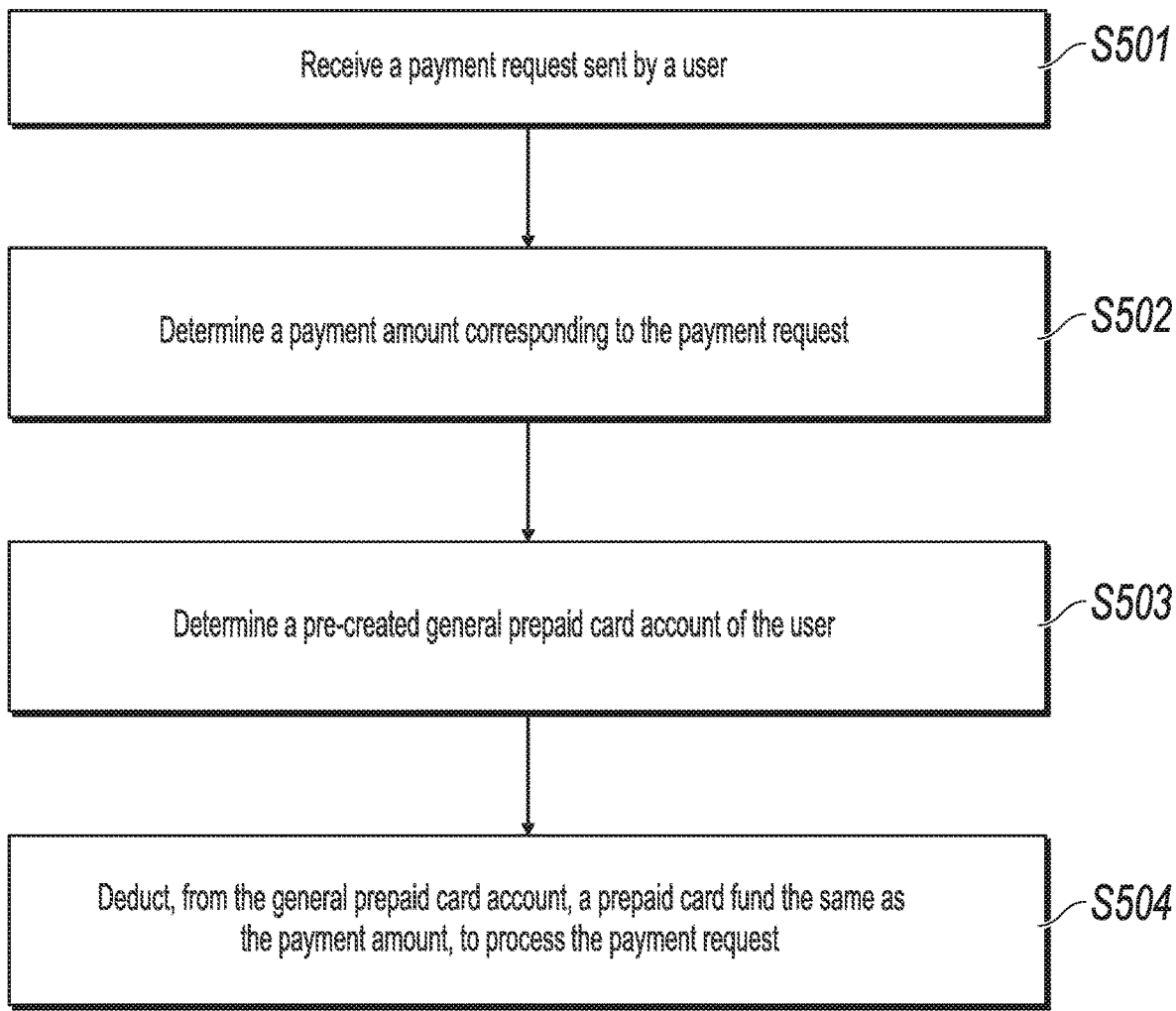

The method in FIG. 5b includes the following steps:

S501. Receive a payment request sent by a user.

The user needs to pay corresponding amounts after obtaining services provided by the merchant, for example, selling or lending merchandise, food/drink, or accommodation. In a method of the present implementation of the present application, the payment request can be sent by the user by using an end-user device of the user. The merchant can provide a corresponding quick response code for the user, and the user sends the payment request after the user uses the end-user device to scan the code. In another method of the present implementation of the present application, the payment request can be sent by the merchant. The merchant can send the service request to the server by using a settlement device (for example, a POS machine or an end-user device) of the merchant.

Both the service request sent by the user and the service request sent by the merchant carry an identifier of the user (for example, an account registered with the payment service provider by the user, a phone number, or a user ID) and an identifier of the merchant (for example, a merchant name or a merchant ID).

S502. Determine a payment amount corresponding to the payment request.

The payment request carries corresponding information about the payment amount, so that the server can determine, based on the information about the payment amount, the amount to be paid for the payment request.

S503. Determine a pre-created general prepaid card account of the user.

The general prepaid card account includes all prepaid card funds belonging to the user.

It is worthwhile to note here that in this actual application scenario, the merchant provides the prepaid card. In view of this, the server creates the prepaid card account (including a prepaid card sub-account and the general prepaid card account) for the user based on the identifier of the merchant and the identifier of the user.

In other words, the server determines, based on the identifier of the user and the identifier of the merchant that are carried in the service request, the prepaid card account corresponding to the merchant, and determines, based on the identifier of the user, the prepaid card account belonging to the user.

S504. Deduct, from the general prepaid card account, a prepaid card fund the same as the payment amount, to process the payment request.

After deducting the corresponding prepaid card fund from the general prepaid card account of the user, the server notifies the merchant of the successful deduction, so that the merchant completes a payment transaction of the user. In addition, the server notifies the user that the fund is successfully deducted from the prepaid card account of the user, and presents corresponding deduction details. Certainly, the present application is not limited thereto here.

The resource processing method in this scenario further includes a process of creating the general prepaid card account, a process of counting a total amount of prepaid card funds based on prepaid card funds in the prepaid card sub-accounts, and a process of deducting prepaid card resources.

In this scenario, pre-creating the general prepaid card account of the user includes the following: determining each pre-created prepaid card sub-account of the user (each prepaid card sub-account stores a prepaid card fund purchased by the user each time); counting a total amount of prepaid card funds of the prepaid card sub-accounts; and creating the general prepaid card account for the user based on the counted total amount, and storing, in the general prepaid card account, prepaid card funds the same as the total amount.

As mentioned above, after the user purchases the prepaid card of the merchant, the server creates the prepaid card sub-account for the user based on the identifier of the user and the identifier of the merchant. The prepaid card sub-account can indicate that the prepaid resource is provided by the merchant, and the prepaid card sub-account belongs to the user.

In this process, the counting a total amount of prepaid card funds of the prepaid card sub-accounts includes the following: determining a conversion coefficient of a prepaid card fund in each prepaid card sub-account; and counting the total amount of the prepaid card funds of the prepaid card sub-accounts based on the determined conversion coefficient of each prepaid card sub-account.

In a process of deducting prepaid card funds, the method further includes the following: deducting a corresponding quantity of prepaid card funds from each prepaid card sub-account corresponding to the user, based on the prepaid card funds deducted from the general prepaid card account of the user.

Further, the deducting a corresponding quantity of prepaid card funds from each prepaid card sub-account corresponding to the user can include the following: deducting the corresponding quantity of prepaid card funds from each prepaid card sub-account based on a time sequence of establishing associations between the prepaid card sub-accounts and the user; or determining a priority sequence of the prepaid card sub-accounts based on the conversion coefficient of the prepaid resources in each prepaid card sub-account, and deducting the corresponding quantity of prepaid card funds from each prepaid card sub-account based on the determined priority sequence of the prepaid card sub-accounts.

The previous content is similar to content described in the method shown in FIG. 1b. Details are omitted here for simplicity.

The resource processing method provided in an implementation of the present application is described above. Based on the same idea, an implementation of the present application further provides a resource processing apparatus.

Figure 6:
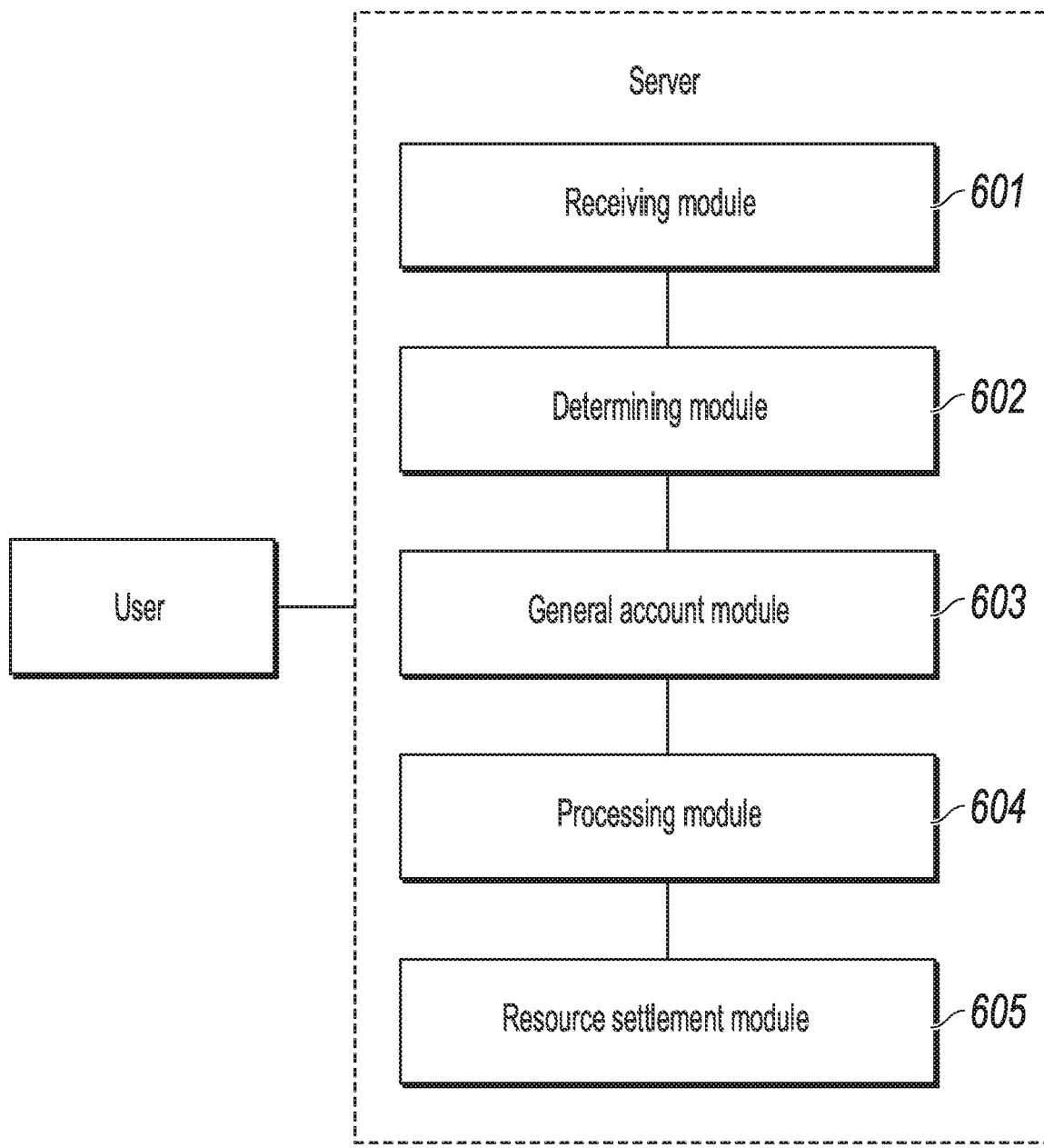
FIG. 6 is a schematic structural diagram illustrating a service processing apparatus, according to an implementation of the present application.

As shown in FIG. 6, the apparatus includes the following: a receiving module 601, configured to receive a service request sent by a user; a determining module 602, configured to determine a resource consumption quantity corresponding to the service request; a general account module 603, configured to determine a pre-created general resource account of the user, where the general resource account includes all prepaid resources belonging to the user; and a processing module 604, configured to obtain, from the general resource account, prepaid resources corresponding to the resource consumption quantity, to process the service request.

The general account module 603 determines each pre-created resource sub-account of the user, where each resource sub-account stores prepaid resources obtained by the user each time; counts a total resource quantity of prepaid resources of the resource sub-accounts; and creates the general resource account for the user based on the counted total resource quantity, and stores, in the general resource account, the prepaid resources corresponding to the total resource quantity.

Further, the general account module 603 determines a conversion coefficient of prepaid resources in each resource sub-account; and counts the total resource quantity of the prepaid resources of the resource sub-accounts based on the determined conversion coefficient of each resource sub-account.

The apparatus further includes a resource settlement module 605, configured to deduct, based on the quantity of prepaid resources obtained from the general resource account of the user, a corresponding quantity of prepaid resources from each resource sub-account corresponding to the user.

The resource settlement module 605 deducts the corresponding quantity of prepaid resources from one or more resource sub-accounts based on a time sequence of establishing associations between the resource sub-accounts and the user; or determines a priority sequence of the resource sub-accounts based on the conversion coefficient of the prepaid resources in each resource sub-account, and deducts the corresponding quantity of prepaid resources from one or more resource sub-accounts based on the determined priority sequence of the resource sub-accounts.

Figure 7:
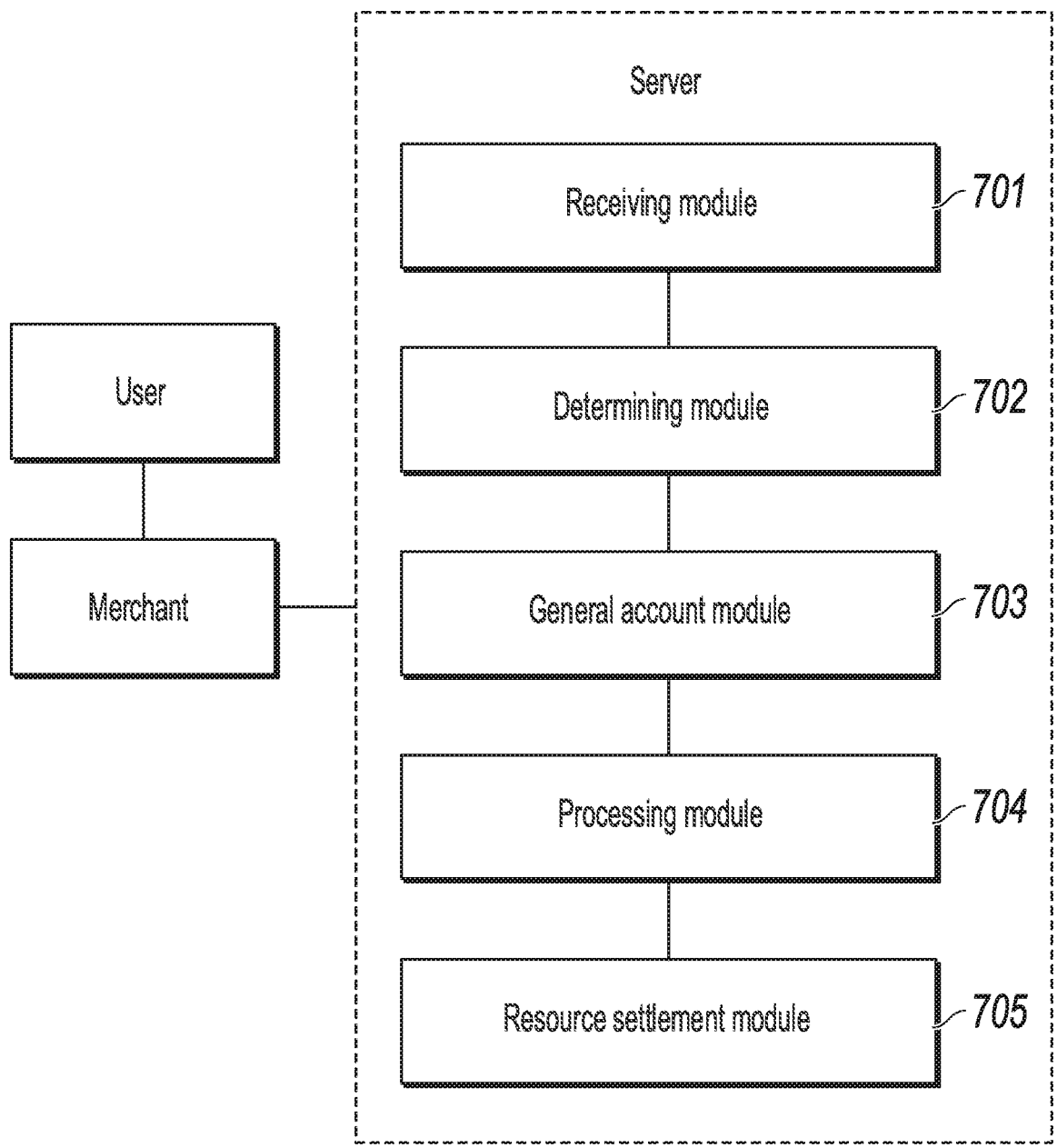
FIG. 7 is a schematic structural diagram illustrating a resource processing apparatus in a merchant scenario, according to an implementation of the present application.

An apparatus based on the apparatus shown in FIG. 6 can be applied in a scenario that a user uses a prepaid card. Specifically, as shown in FIG. 7, an implementation of the present application provides a resource processing apparatus in this scenario. The apparatus includes the following: a receiving module 701, configured to receive a payment request sent by a user; a determining module 702, configured to determine a payment amount corresponding to the payment request; a general account module 703, configured to determine a pre-created general prepaid card account of the user, where the general prepaid card account includes all prepaid card funds belonging to the user; and a processing module 704, configured to deduct, from the general prepaid card account, a prepaid card fund the same as the payment amount, to process the payment request.

The general account module 703 determines each pre-created prepaid card sub-account of the user, where each prepaid card sub-account stores a prepaid card fund purchased by the user each time; counts a total amount of prepaid card funds of the prepaid card sub-accounts; and creates the general prepaid card account for the user based on the counted total amount, and stores, in the general prepaid card account, prepaid card funds the same as the total amount.

Further, the general account module 703 determines a conversion coefficient of a prepaid card fund in each prepaid card sub-account; and counts the total amount of the prepaid card funds of the prepaid card sub-accounts based on the determined conversion coefficient of each prepaid card sub-account.

The apparatus further includes a resource settlement module 705, configured to deduct a corresponding quantity of prepaid card funds from one or more prepaid card sub-account corresponding to the user, based on the prepaid card funds deducted from the general prepaid card account of the user.

A person skilled in the art should understand that the implementations of the present disclosure can be provided as a method, a system, or a computer program product. Therefore, the present disclosure can use a form of hardware only implementations, software only implementations, or implementations with a combination of software and hardware.

Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage, another magnetic storage device or any other non-transmission medium. The computer storage medium can be configured to store information that can be accessed by the computing device. Based on the definition in the present specification, the computer readable medium does not include computer-readable transitory media, for example, a modulated data signal and carrier.

It is worthwhile to note that terms "include", "comprise", or their any other variant is intended to cover non-exclusive inclusion, so that a process, a method, an article, or a device that includes a series of elements not only includes these elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 8:
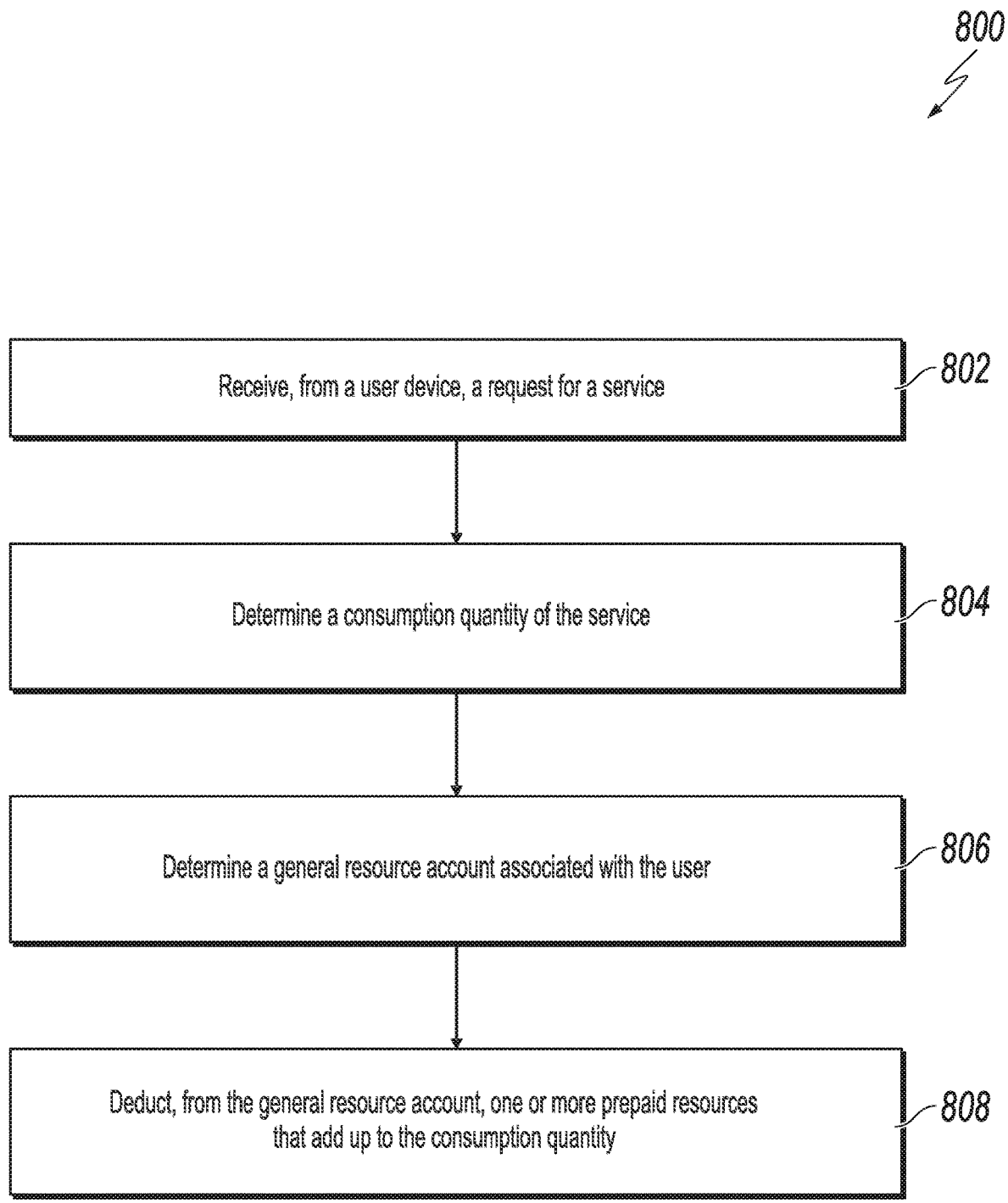
FIG. 8 is a flowchart illustrating an example of a computer-implemented method for an efficient deduction of prepaid resources to provide a service, according to an implementation of the present disclosure.

FIG. 8 is a flowchart illustrating an example of a computer-implemented method 800 for an efficient deduction of prepaid resources to provide a service, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a request for a service is received. The request can be received from a user device and can include a user identification of a user (e.g., the user depicted in FIG. 1*a*) of the device. The service can be a request for an online or an off-line service, such as ordering a food, renting a movie, receiving a software license, etc. The request can be received by one or more processors of a system, for example the processors of the server depicted in FIG. 1*b*. From 802, method 800 proceeds to 804.

At 804, a consumption quantity associated with the service is received. The consumption quantity can indicate a value associated with providing the requested service. For example, the consumption quantity may indicate how many dollars need to be spent to receive the service. From 804, method 800 proceeds to 806.

At 806, a general resource account associated with the user is determined. The general resource account can be a pre-created account of the user and can include a total value that represents a total value of the assets of the user that are stored on the system. For example, each time the user acquires an asset, the asset and/or a value of the asset can be recorded in the general resource account. Each asset can be a set of prepaid resources (e.g., a dollar amount) or can be associated with a set of prepaid resources (e.g., a tag that has a dollar value). The prepaid resources can be in form of a currency (e.g., bitcoin, dollar, etc.), coupons (e.g., electronic coupons), scores (e.g., game scores), etc. Accordingly, the general resource account includes a total value that indicates an aggregated value of one or more sets of prepaid resources that belong to the user. From 806, method 800 proceeds to 808.

At 808, one or more prepaid resources that add up to the consumption quantity of the service are deducted from the general resource account. Upon deducting the one or more prepaid resources, the service can be provided to the user. For example, as explained with reference to FIG. 4a above, when the consumption quantity of the service is 100 resources, 100 prepaid resources will be deducted from the general resource account of the user in order to provide the service to the user.

In some implementations, each of the sets of prepaid resources is stored in a sub-account of the user that may have been created when the user obtained the respective set of prepaid resources. In these implementations, the general resource account can be created by: determining a sub-account value associated with each sub-account, aggregating the subaccount values to generate a total value, and creating the general resource account by generating an account that includes the total value and is associated with the user.

Any of the sets of prepaid resources (or the sub-accounts) can be associated with a conversion coefficient. As explained above (e.g., with reference to FIG. 4b), if a set of prepaid resources is associated with a conversion coefficient, the prepaid resources in that set are weighted based on the conversion coefficient. For example, when a first set of prepaid resources is associated with a first conversion coefficient that is twice as much as a second conversion coefficient of a second set of prepaid resources, the prepaid resources in the first set are worth twice as much as the prepaid resources in the second set.

When the sub-account values of the sub-accounts are being determined, the conversion coefficients of the sets are taken into consideration. To determine the total value of the general account resource, a number of prepaid resources in each sub-account is counted and multiplied with the respective conversion coefficient of the sub-account. For example, since the sub-account 1 in FIG. 4b is associated with a conversion coefficient 2, the number of prepaid resources in the sub-account 1 (which is 50) is multiplied to 2 to provide 100 prepaid resources for the general resource account.

The method 800 can further include deducting, from at least one sub-account associated with the user, one or more prepaid resources that add up to the consumption quantity of the service. However, deducting the prepaid resources from the sub-accounts has no effect on the speed of responding to the user request as the deduction happens independent from responding to the user request and even be performed after the server allows providing the service to the user.

In some implementations, the one or more prepaid resources are deducted from random sub-accounts of the user. In some implementations, the sub-accounts are prioritized and the deduction is made from the sub-accounts with higher priority. In some examples, the sub-accounts are prioritized based on a sequence of creation or a latest update of the sub-accounts. For example, the sub-accounts that have been created earlier in time may be given a higher priority than the sub-accounts that were created later in time. In some examples, the sub-accounts are prioritized based on their respective conversion coefficients. For example, the sub-accounts that have greater conversion coefficients may be prioritized as higher than the sub-accounts that have lower conversion coefficients.

The service request received from the user device (at 802) can include an identification of the service or an identification of the service provider that provides the service. In some implementations, the prepaid resources in the sub-accounts (or in the one or more sets of prepaid resources) can be associated with particular services or particular service providers. For example, the prepaid resources in a first sub-account may be game scores that can be used only in games offered by a particular website. Each set of prepaid resources (or sub-accounts) may differ from other sets (or other sub-accounts) based on a time at which the set was acquires (e.g., the prepaid resources of the sub-account were obtained), and/or by a service and/or service provider to which the set is associated. In such implementations, the at least one sub-account, from which the prepaid resources that add up to the value of the service are deducted (as described in the preceding paragraph), is selected from the sub-accounts that store the prepaid resources associated with the service and/or the service provider that is included in the service request.

A user of computing devices can request services and pay for the services through prepaid resources that the user has previously acquired. The prepaid resources can be in form of currencies (e.g., bitcoin, dollar), coupons (e.g., electronic coupons), scores (e.g., game scores), etc. The prepaid resources can be acquired by buying (e.g., credits, pre-filled cards), obtaining coupons, scanning barcodes, entering particular codes, etc. When a user acquires a set of prepaid resources, the prepaid resources can be stored in a sub-account of the user.

When the user requests a service, a server determines a value (or price) of providing the service and deducts the value of the service from the user's sub-accounts to pay for the service. Upon determining that there is enough prepaid resources in the user's sub-accounts, or upon a deduction of the value of the service from such sub-accounts, the server provides the service to the user. Accordingly, before the server can provide the service to the user, the server needs to determine the sub-accounts associated with the user, check the sub-accounts one by one, and deduct the value from one or more sub-accounts. Such procedure takes time and delays providing the service to the user.

The implementations of the present disclosure improve the speed of providing a requested service by reducing the delay that is caused by checking a plurality of user sub-accounts to deduct the value of a requested service. Instead of checking multiple sub-accounts for each service request, the implementations check a single general resource account of the user for any service request. More specifically, the implementations determine a value associated with each sub-account and aggregate the values to provide a total value that is recorded in the general resource account. Upon receiving a service request, the server checks this single general resource account to verify whether the user has enough prepaid resources to afford the service and/or to deduct prepaid resources that would pay for the value of the service, from the general resource account. Upon such verification and/or deduction, the server provides the service to the user. Accordingly, transactions can go through faster than in systems that check multiple sub-accounts for deducting the service value before providing the service.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
   receiving, by the one or more processors and from a user device, a request for a service, the request comprising a user identification of a user of the user device;
   determining, by the one or more processors, a consumption quantity of the service, the consumption quantity indicating a value associated with providing the service;
   determining, by the one or more processors, a general resource account associated with the user identification, the general resource account comprising a total value that indicates an aggregated value of one or more sets of prepaid resources stored in a plurality of sub-accounts and belonging to the user, wherein the general resource account is configured to improve service processing speed by enabling a direct deduction of one or more prepaid resources from the total value of the general resource account and the plurality of sub-accounts are created each time the user device receives a prepaid resource;
   deducting, by the one or more processors, the one or more prepaid resources from the total value of the general resource account, the one or more prepaid resources adding up to the value of the consumption quantity of the service; and
   in response to deducting the one or more prepaid resources from the total value of the general resource account, providing the service to the user device.

2. The computer-implemented method of claim 1, wherein each set in the one or more sets of prepaid resources differs from other sets in the one or more sets of prepaid resources based on a time that the set was obtained or a service provider to which the set is associated.

3. The computer-implemented method of claim 1, further comprising creating the general resource account by:
   determining the plurality of sub-accounts associated with the user, each sub-account including a respective set of prepaid resources of the one or more sets of prepaid resources and having been created when the user obtained the respective set of prepaid resources;
   determining a plurality of sub-account values, each sub-account value being associated with a respective sub-account of the plurality of sub-accounts;
   aggregating the plurality of sub-account values to generate the total value of the general resource account; and
   creating the general resource account by generating an account that includes the total value and is associated with the user.

4. The computer-implemented method of claim 3, wherein a set of prepaid resources of a sub-account is associated with a conversion coefficient.

5. The computer-implemented method of claim 4, wherein a first set of prepaid resources is associated with a first conversion coefficient and a second set of prepaid resources is associated with a second conversion coefficient that is different from the first conversion coefficient.

6. The computer-implemented method of claim 4, wherein aggregating the plurality of sub-account values comprises counting a number of prepaid resources in a respective sub-account and multiplying the number by the conversion coefficient.

7. The computer-implemented method of claim 3, further comprising deducting from at least one sub-account of the plurality of sub-accounts, the one or more prepaid resources.

8. The computer-implemented method of claim 7, wherein the request includes an identification of a service provider that provides the service, and the method further comprising:
   determining that the at least one sub-account, from which the one or more prepaid resources is deducted, stores prepaid resources associated with the service provider.

9. The computer-implemented method of claim 7, further comprising:
   determining a time sequence that indicates a sequence of creation of the plurality of sub-accounts; and
   selecting the at least one sub-account from the plurality of sub-accounts based on the time sequence.

10. The computer-implemented method of claim 7, wherein each sub-accounts is associated with a conversion coefficient; and
   selecting the at least one sub-account based on a plurality of conversion coefficients associated with the plurality of sub-accounts.

11. A non-transitory computer-readable storage medium coupled to one or more computers and configured with instructions executable by the one or more computers to:
   receive, from a user device, a request for a service, the request comprising a user identification of a user of the user device;
   determine a consumption quantity of the service, the consumption quantity indicating a value associated with providing the service;
   determine a general resource account associated with the user identification, the general resource account comprising a total value that indicates an aggregated value of one or more sets of prepaid resources stored in a plurality of sub-accounts and belonging to the user, wherein the general resource account is configured to improve service processing speed by enabling a direct deduction of one or more prepaid resources from the total value of the general resource account and the plurality of sub-accounts are created each time the user device receives a prepaid resource;
   deduct the one or more prepaid resources from the total value of the general resource account, the one or more prepaid resources adding up to the value of the consumption quantity of the service; and
   in response to deducting the one or more prepaid resources from the total value of the general resource account, provide the service to the user device.

12. The non-transitory computer-readable storage medium of claim 11, wherein each set in the one or more sets of prepaid resources differs from other sets in the one or more sets of prepaid resources based on a time that the set was obtained or a service provider to which the set is associated.

13. The non-transitory computer-readable storage medium of claim 11, further configured with the instructions executable by the one or more computers to:
- determine the plurality of sub-accounts associated with the user, each sub-account including a respective set of prepaid resources of the one or more sets of prepaid resources and having been created when the user obtained the respective set of prepaid resources;
- determine a plurality of sub-account values, each sub-account value being associated with a respective sub-account of the plurality of sub-accounts;
- aggregate the plurality of sub-account values to generate the total value of the general resource account; and
- create the general resource account by generating an account that includes the total value and is associated with the user.

14. The non-transitory computer-readable storage medium of claim 13, wherein a set of prepaid resources of a sub-account is associated with a conversion coefficient.

15. The non-transitory computer-readable storage medium of claim 14, wherein a first set of prepaid resources is associated with a first conversion coefficient and a second set of prepaid resources is associated with a second conversion coefficient that is different from the first conversion coefficient.

16. The non-transitory computer-readable storage medium of claim 14, wherein aggregating the plurality of sub-account values comprises counting a number of prepaid resources in a respective sub-account and multiplying the number by the conversion coefficient.

17. The non-transitory computer-readable storage medium of claim 13, further configured with the instructions executable by the one or more computers to deduct from at least one sub-account of the plurality of sub-accounts, the one or more prepaid resources.

18. The non-transitory computer-readable storage medium of claim 17, wherein the request includes an identification of a service provider that provides the service, and the medium further configured with instructions executable by the one or more computers to non-transitory computer-readable storage medium further comprising:
- determine that the at least one sub-account, from which the one or more prepaid resources is deducted, stores prepaid resources associated with the service provider.

19. The non-transitory computer-readable storage medium of claim 17 further configured with the instructions executable by the one or more computers to:
- determine a time sequence that indicates a sequence of creation of the plurality of sub-accounts; and
- select the at least one sub-account from the plurality of sub-accounts based on the time sequence.

20. A system, comprising:
- one or more computers; and
- one or more computer-readable memories coupled to the one or more computers and configured with instructions executable by the one or more computers to:
  - receive, from a user device, a request for a service, the request comprising a user identification of a user of the user device,
  - determine a consumption quantity of the service, the consumption quantity indicating a value associated with providing the service,
  - determine a general resource account associated with the user identification, the general resource account comprising a total value that indicates an aggregated value of one or more sets of prepaid resources stored in a plurality of sub-accounts and belonging to the user, wherein the general resource account is configured to improve service processing speed by enabling a direct deduction of one or more prepaid resources from the total value of the general resource account and the plurality of sub-accounts are created each time the user device receives a prepaid resource,
  - deduct the one or more prepaid resources from the total value of the general resource account, the one or more prepaid resources adding up to the value of the consumption quantity of the service, and
  - in response to deducting the one or more prepaid resources from the total value of the general resource account, provide the service to the user device.

* * * * *